June 12, 1951 A. G. PERKINS ET AL 2,556,596
CONTROL DEVICE FOR MILKING MACHINES

Filed Sept. 9, 1947 2 Sheets—Sheet 1

INVENTORS
Albert G. Perkins
Alfred H. Perkins
BY Walter P. Geyer
ATTORNEY

June 12, 1951 A. G. PERKINS ET AL 2,556,596
CONTROL DEVICE FOR MILKING MACHINES
Filed Sept. 9, 1947 2 Sheets—Sheet 2

INVENTORS
Albert G. Perkins,
Alfred G. Perkins,
BY Walter P. Geyer
ATTORNEY

Patented June 12, 1951

2,556,596

UNITED STATES PATENT OFFICE 2,556,596

CONTROL DEVICE FOR MILKING MACHINES

Albert G. Perkins and Alfred G. Perkins, Grand Island, N. Y.

Application September 9, 1947, Serial No. 772,958

11 Claims. (Cl. 119—14.08)

This invention relates generally to certain new and useful improvements in milking machine equipment but more particularly to a control device for such machines which will cause the automatic release of the teat cups from the cow as the respective quarters of the cow's bag are milked out.

It has for one of its objects to provide a simple and effective device of this character which is so designed and constructed as to be readily connected to existing milking machines, which is positive and reliable in operation, and which prevents injury from overmilking of the cow by causing the individual dropping of the teat cups from the cow as the respective quarters thereof become milked out.

Another object of the invention is to provide a milk flow control device for milking machines which utilizes the vacuum employed in such machines as well as other means constituting a self-contained part of the device for governing its operation.

Other features of the invention reside in the construction and arrangement of parts hereinafter described and particularly pointed out in the appended claims.

Figure 1:
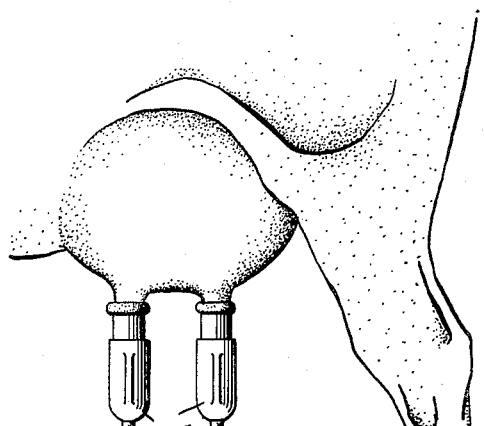
Figure 1:
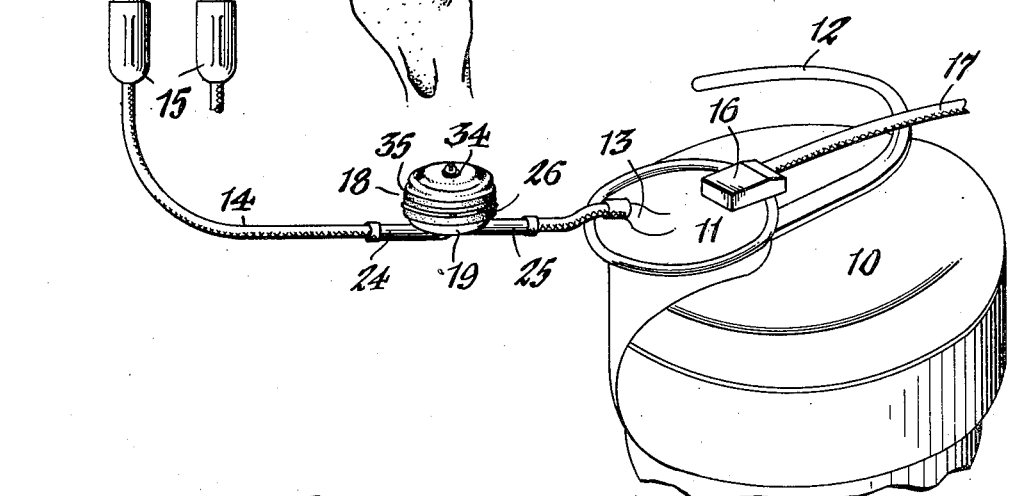
Figure 2:
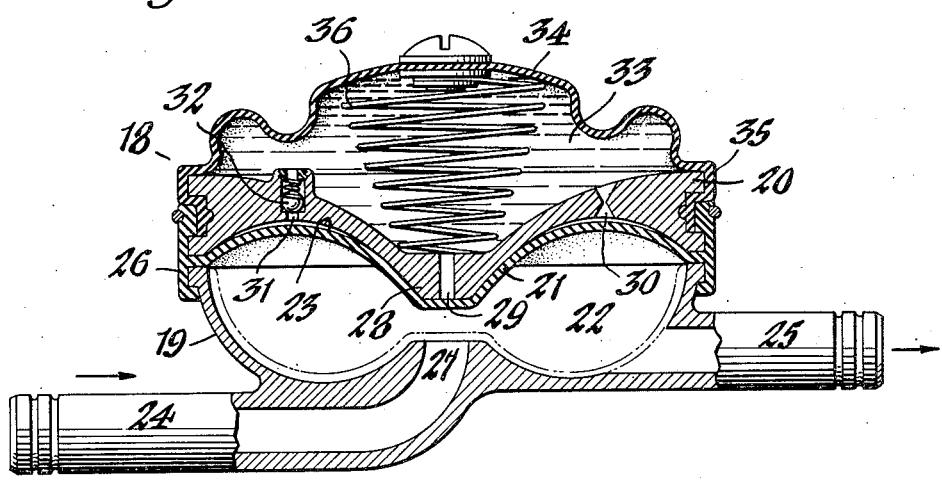
Figure 3:
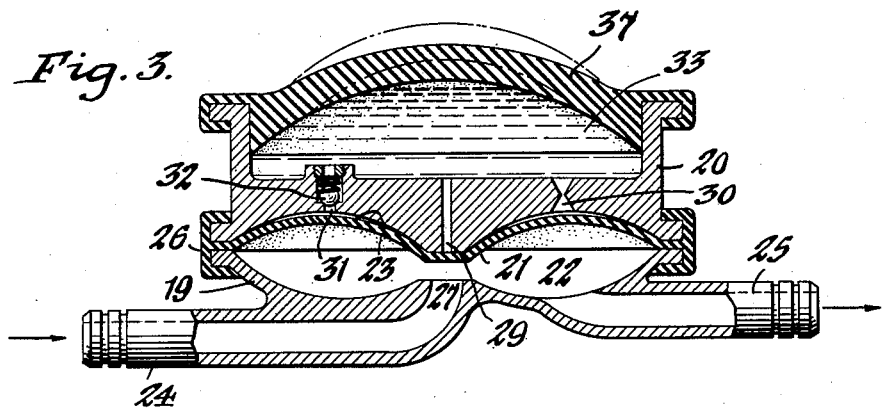
Figure 4:
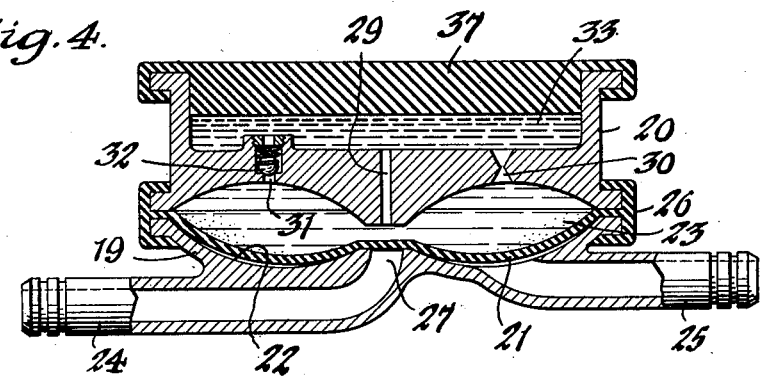
Figure 5:
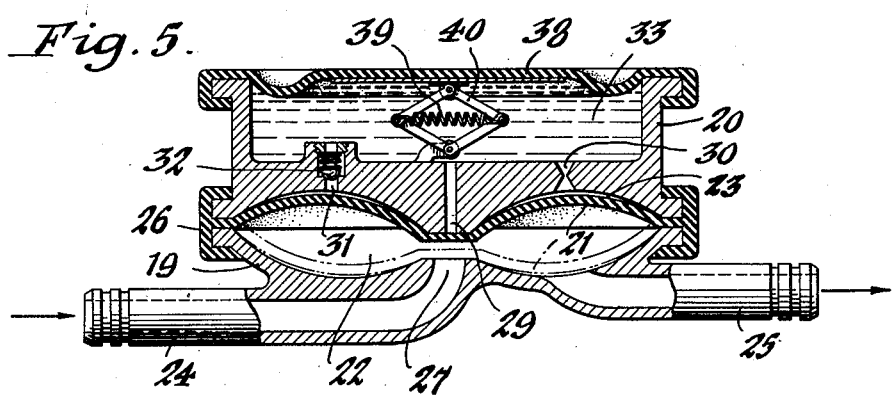

In the accompanying drawings:

Figure 1 is a fragmentary perspective view of a milking machine showing our control device associated therewith. Figure 2 is an enlarged cross section of the control device. Figures 3 and 4 are similar cross sections of a modification thereof showing the position of the parts in normal milk flow operation and in non-flow or shut-off position, respectively, when the companion quarter of the cow's bag has been milked out. Figure 5 is a similar section of another modified form of the invention.

Similar characters of reference indicate corresponding parts throughout the several views.

By way of example, we have shown our control device or controlled quarter milker applied to a well known type of pulsating milking machine, wherein 10 indicates the milk-receiving can having a cover 11 and a bail 12, the cover having milk intake tubes 13 applied thereto (one being shown in the drawings) which are individually connected by a companion flexible conduit or hose connection 14 having a teat cup 15 at its free end for detachable connection to the cow's teats. Also applied to the cover is the customary pulsator 16 which is connected by a hose 17 to the suction source. Interposed in each hose connection 14 is one of our control units, indicated generally by the numeral 18, and through which the milk flows from the cow to the can.

Each control unit operates to automatically cut off the vacuum employed in the machine during the milking operation to the companion quarter of the cow's bag and to cause the automatic release or dropping of the companion teat cup from the cow at such time as that quarter is milked out, thereby preventing injury to the cow from overmilking. In the embodiment of the invention shown in Figures 1 and 2, each control unit consists of a hollow or chambered body composed of opposing separable sections 19 and 20 made of metal or like material and detachably joined together in sealed relation in any suitable manner. These sections are divided or separated by a displaceable, flexible partition or diaphragm 21 to provide a milk flow chamber 22 and an intermediate fluid control chamber 23. The lower body-section 19 has nipples 24 and 25 projecting from its opposite sides to which the intake and outlet branches respectively of the milk flow conduit 14 are connected in the manner shown in Figure 1, whereby the milk drawn from the cow by the vacuum of the machine flows through such section and then to the can. The diaphragm 21 has a collar 26 formed integrally therewith which serves to detachably connect it to the body-section as well as couple the latter in firm sealed relation. The intake nipple 24 terminates in a port 27 opening upwardly and substantially centrally of the body-section 19, and the diaphragm is adapted to automatically respond to variations of vacuum to assume the normal full line, milk flow position shown in Figure 2 or the deflated, dotted line position across the port 27 to shut off the vacuum to the companion teat cup 15 and cause the latter to drop by gravity from the cow's teat when the surge of milk through the unit is reduced to a minimum.

The upper body-section 20 is preferably dished in substantially annular fashion to provide an axial or centrally-disposed, conical-like projection 28 in opposing relation to the milk-intake port 27 and having an alining port 29 therein over which the diaphragm 21 extends during the normal milking operation. Also opening into the control chamber 23 and formed in the dished portion of this body-section are ports or passages 30 and 31 which serve as fluid by-passes to such chamber, the port 31 having a normally-closed, spring-urged check valve 32 applied thereto. At their upper ends these ports open into an upper or auxiliary fluid chamber 33 formed by the top side of the body-section 20 and by a flexible wall 34 adapted to be displaced by changes in vacuum toward and from such body-section and having an attaching collar 35 for coupling and sealing engagement with said body-section in the manner shown in Figure 2. The body-section 20 forms a partition between the communicating fluid chambers 23 and 33 and the latter is preferably filled with a fluid, such as water, which is adapted to flow from the upper chamber to the intermediate chamber during the collapse of the diaphragm 21 to its milk flow cut-off position shown by dotted lines in Figure 2, and to be displaced in a reverse direction from the intermediate chamber into the upper chamber when the diaphragm is being restored to its normal upwardly disposed position shown by full lines in said figure. A spring 36 is interposed between the top of the body-section 20 and the flexible wall 34 which tends constantly to displace the latter upwardly to its normal position and which is adapted to be compressed to deflate such wall by the variation in the vacuum present in the milk flow chamber 22 when the companion quarter of the cow's bag is milked out. At such time, the water will flow from the upper chamber 33 into the intermediate chamber 23 through the port 30 and at a predetermined time the diaphragm 21 will be pulled away from sealing engagement with the axial port 29 and thereupon the diaphragm will be displaced rapidly across the milk intake port 27. This shuts off the vacuum to the teat cup and it drops by gravity from the cow. On the return of the diaphragm to its normal position, and which action is initiated by the spring 36 to create a counter vacuum effect, the water is displaced through the ports 29 and 30 as well as through the valved port 31, the latter functioning to effect a more prompt return of the parts to their normal milking position. The provision of a liquid, such as water, produces a nicety of control of the diaphragm, and for a more gradual and accurate response during the shutting off operation.

In the modified form of the invention shown in Figures 3 and 4, the flexible top wall 37 is in the form of an elastic cover, its inherent elasticity tending to displace it to the normal dome-like shape shown by dotted lines in Figure 3. Figure 4 shows the disposition of the parts in the shut-off position.

Another form of a flexible top wall is shown in Figure 5, wherein 38 indicates the flexible wall which is normally urged to its upwardly displaced position by a spring 39 joined to an expandable linkage assembly 40.

During the milking period, the diaphragm 21 will fluctuate and the fluid will circulate in intermittent fashion from the upper chamber to the intermediate chamber through the port 30 in response to the vacuum and from the intermediate chamber to the upper chamber through the valved port 31, in response to the pulsations or intermittent surges of milk through the device created by the operation of the milking machine. As the companion quarter of the cow's bag is milked out, the resulting variation of the vacuum in the chamber 22 will cause the partial collapse of the diaphragm 21 and that of the top wall of the upper chamber 33 to effect a gradual flow of the fluid into the intermediate chamber 23 until such time as the diaphragm is pulled from sealing relation with the port 29, when the flow of the fluid will be increased and the diaphragm will be quickly collapsed across the milk intake port 27, resulting in the dropping off of the companion teat cup from the cow. Thereafter, when the teat cup drops off, atmosphere will unseat the diaphragm and the spring or elastic pressure associated with the top wall of the upper chamber will restore the parts to their initial position in readiness for another milking operation.

The hose connections 14 to the nipples 24, 25 are such as to vent and break the vacuum in the milk flow line when the milking operation is completed from a given quarter of the cow's bag, and to this end the attaching ends of such connections may be grooved or ribbed in an obvious manner to provide vent passages opening at one end into the line and at their other ends into the atmosphere.

We claim:

1. The combination with a milking machine of the pulsating type having teat connections for conducting the milk from the cow to a milk-receiving can, of a vacuum-governed unit interposed in each connection and including a milk flow chamber having an intake port opening into the same and through which the milk flows from the cow to the can, and a pair of intercommunicating fluid control chambers including by-pass ports for controlling the interflow of the fluid between such chambers and a flexible diaphragm in correlation with said fluid control chambers and its ports and said milk flow chamber and its intake port and responsive to the variation of vacuum in the milk flow chamber for automatically shutting off said intake port and the vacuum to and the release of the teat connection from the cow when the companion quarter of its bag is milked out.

2. In a device of the character described, a hollow body composed of opposing, chamber-forming sections adapted to be detachably coupled in sealed relation, a vacuum responsive diaphragm disposed between and separating the opposing chambers, one of said chambers being adapted for interflow communication with a liquid-conveying conduit and having an intake port opening into the same, and adapted to be closed by said diaphragm, and an auxiliary fluid chamber surmounting the other of said opposing chambers in fluid-circulating relation thereto and having a normally-distended, contractible top wall, said fluid chamber having a port therein normally closed by said diaphragm.

3. In a device of the character described, a chambered body composed of a lower section, an intermediate section and a flexible normally-distended and contractible top section forming a fluid chamber between it and said intermediate section, a diaphragm disposed between and separating said lower and intermediate sections to divide the same into upper and lower chambers, the lower chamber being adapted for interflow communication with a liquid-conveying conduit under vacuum and having a normally-open intake port opening into such chamber and adapted to be closed by said diaphragm, and means in said intermediate section for establishing communication between said fluid chamber and the diaphragm-forming upper chamber and governed by the diaphragm.

4. In a device of the character described, a chambered body composed of a lower section, an intermediate section and a flexible normally-distended and contractible top section forming a fluid chamber between it and said intermediate section, a diaphragm disposed between and separating said lower and intermediate sections to divide the same into upper and lower chambers, the lower chamber being adapted for interflow communication with a liquid-conveying conduit under vacuum and having a normally-open intake port opening into such chamber and adapted to be closed by said diaphragm, and means in said intermediate section for establishing communication between said fluid chamber and the diaphragm-forming upper chamber and governed by the diaphragm, said means including a port normally closed by said diaphragm and a check valve controlled port normally closed against downward circulation of the fluid from the fluid chamber into the diaphragm-forming upper chamber but adapted to open for the upward circulation of the fluid from the latter to the former.

5. In a device of the character described, a chambered body composed of a lower section, an intermediate section and a flexible top section forming a fluid chamber between it and said intermediate section, a spring interposed between the latter and said top section for urging such section to a distended position, a diaphragm between said lower and intermediate sections to divide the same into upper and lower chambers, the lower chamber being adapted for interflow communication with a liquid conveying conduit under vacuum and having a normally-open intake port opening into said chamber and adapted to be closed by said diaphragm, and control ports in said intermediate section for providing fluid circulation between said fluid chamber and the diaphragm-forming upper chamber and governed by the diaphragm.

6. The combination with a milking machine of the pulsating type having teat connections for conducting the milk from the cow to a milk receiving can, of a vacuum governed control unit interposed in each teat connection and including a body defining a lower chamber and an upper fluid-filled chamber having a contractible, normally distended top wall, a vacuum and fluid influenced diaphragm in said lower chamber dividing it into opposing chambers, one chamber serving as a milk flow chamber and having a milk intake port therein governed by said diaphragm and the opposing chamber being in fluid communication with said upper fluid-filled chamber and in operative governing relation with said diaphragm for normally retaining the latter in its port-released position and for causing its displacement to its port-closing position when the companion quarter of the cow's bag is milked out.

7. In a milk flow control unit for milking machines, a hollow body having a diaphragm therein dividing the same into opposing chambers, one chamber constituting a milk flow chamber and having a milk intake port therein governed by said diaphragm, and a normally-distended fluid chamber in communicating relation with the other of said opposing chambers for governing the displacement of the diaphragm to and from closed relation with said intake port.

8. In a milk flow control unit for milking machines, a hollow body having a diaphragm therein dividing the same into opposing chambers, one chamber constituting a milk flow chamber and having a milk intake port therein governed by said diaphragm, and contractible means applied to the top of said body and forming a fluid chamber in communication with the other of said opposing chambers for governing the displacement of the diaphragm to and from closed relation with said intake port.

9. In a milk flow control unit for milking machines, a hollow body having a diaphragm therein dividing the same into opposing chambers, one chamber constituting a milk flow chamber and having a milk intake port therein governed by said diaphragm, and means forming a fluid chamber in communicating relation with the other of said opposing chambers and including a displaceable wall normally urged to an expanded position and adapted to be contracted to displace said diaphragm in closed relation with the intake port when the companion quarter of the cow's bag is milked out.

10. In a milk flow control unit for milking machines, a chambered body defining a lower chamber and an upper fluid-filled chamber having a contractible, normally distended top wall, a vacuum and fluid influenced diaphragm in said lower chamber dividing it into opposing chambers, one chamber serving as a milk flow chamber and having a milk intake port therein governed by said diaphragm and the opposing chamber being in fluid communication with said upper chamber and having a control port therein governed by said diaphragm.

11. In a milk flow control unit for milking machines, a chambered body defining a lower chamber and an upper fluid-filled chamber having a contractible, normally distended top wall, a vacuum and fluid influenced diaphragm in said lower chamber dividing it into opposing chambers, one chamber serving as a milk flow chamber and having a milk intake port therein governed by said diaphragm and the opposing chamber being in fluid communication with said upper chamber and having a plurality of control ports therein for establishing fluid circulation between said opposing chamber and said upper chamber, one of such ports being governed by said diaphragm and the other of said ports having a check valve therein opening toward said upper fluid-filled chamber.

ALBERT G. PERKINS.
ALFRED G. PERKINS.

REFERENCES CITED

The following references are of record in the file of this patent:

UNITED STATES PATENTS

| Number | Name | Date |
| --- | --- | --- |
| 1,109,800 | Sorenson | Sept. 8, 1914 |
| 1,183,080 | Kricke | May 16, 1916 |
| 1,203,551 | Mintz | Oct. 31, 1916 |
| 1,387,983 | Hofmeister | Aug. 16, 1921 |

FOREIGN PATENTS

| Number | Country | Date |
| --- | --- | --- |
| 53,077 | Sweden | Nov. 22, 1922 |